United States Patent
Wilhide

(10) Patent No.: US 10,814,740 B2
(45) Date of Patent: Oct. 27, 2020

(54) HESM HIGH PULSE POWER ALGORITHM

(71) Applicant: HAMILTON SUNDSTRAND CORPORATION, Charlotte, NC (US)

(72) Inventor: Matthew L. Wilhide, Cherry Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 383 days.

(21) Appl. No.: 15/639,104

(22) Filed: Jun. 30, 2017

(65) Prior Publication Data

US 2019/0001837 A1    Jan. 3, 2019

(51) Int. Cl.

| | |
|---|---|
| *B60L 58/13* | (2019.01) |
| *B60L 11/18* | (2006.01) |
| *H02J 7/14* | (2006.01) |
| *B60K 1/04* | (2019.01) |
| B60K 1/02 | (2006.01) |
| B60K 6/28 | (2007.10) |
| B60W 10/26 | (2006.01) |
| B60W 20/13 | (2016.01) |

(52) U.S. Cl.
CPC ............... *B60L 58/13* (2019.02); *B60K 1/04* (2013.01); *B60L 11/1862* (2013.01); *H02J 7/14* (2013.01); *H02J 7/1423* (2013.01); B60K 1/02 (2013.01); B60K 6/28 (2013.01); B60W 10/26 (2013.01); B60W 20/13 (2016.01); B60W 2510/244 (2013.01); B60Y 2200/51 (2013.01); B60Y 2400/112 (2013.01); B60Y 2400/114 (2013.01)

(58) Field of Classification Search
CPC ........ B60L 11/1862; B60L 58/13; B60K 1/04; B60K 1/02; B60K 6/28; H02J 7/1423; H02J 7/14; B60W 20/13; B60W 10/26; B60W 2510/244; B60Y 2200/51; B60Y 2400/112; B60Y 2400/114
USPC .................................................. 320/116, 167
See application file for complete search history.

(56) References Cited

U.S. PATENT DOCUMENTS

| | | |
|---|---|---|
| 6,998,822 B2 | 2/2006 | Turner |
| 7,701,082 B2 | 4/2010 | Lazarovich |
| 7,830,686 B2 | 11/2010 | Zeng |
| 8,890,463 B2 | 11/2014 | Rozman |
| 8,981,727 B2 | 3/2015 | Kusch et al. |

(Continued)

OTHER PUBLICATIONS

Wilhide, U.S. Appl. No. 15/230,181, filed Aug. 5, 2016 and entitled "Hybrid Energy Storage Module Arrangements".

(Continued)

*Primary Examiner* — Richard V Muralidar
(74) *Attorney, Agent, or Firm* — Snell & Wilmer LLP

(57) ABSTRACT

A hybrid energy storage module (HESM) configured to be used on an aircraft to provide electrical energy includes a first energy storage component and a second energy storage component each configured to receive the electrical energy, store the electrical energy, and discharge the electrical energy. The HESM also includes a controller coupled to the first energy storage component and the second energy storage component. The controller is configured to control charging and discharging of the first energy storage component and of the second energy storage component such that the first energy storage component is charged to a desired first energy storage component state of charge (SOC) before the second energy storage component is charged.

17 Claims, 4 Drawing Sheets

(56) References Cited

U.S. PATENT DOCUMENTS

| | | | |
|---|---|---|---|
| 9,013,066 B2 | 4/2015 | Kojori | |
| 9,197,088 B2 | 11/2015 | Viellard | |
| 9,230,748 B1 | 1/2016 | Semrau | |
| 9,238,415 B2 | 1/2016 | King et al. | |
| 9,419,522 B1 | 8/2016 | Khaligh | |
| 9,535,480 B2 | 1/2017 | Ye et al. | |
| 10,315,522 B2 * | 6/2019 | Hikiri | B60L 7/14 |
| 2005/0052165 A1 * | 3/2005 | Willner | H02J 7/0063 323/266 |
| 2007/0182362 A1 * | 8/2007 | Trainor | H01M 10/46 320/101 |
| 2009/0309416 A1 * | 12/2009 | Bose | B60K 6/32 307/9.1 |
| 2011/0011659 A1 | 1/2011 | Sailor | |
| 2014/0339902 A1 | 11/2014 | Sepe, Jr. | |
| 2016/0082844 A1 | 3/2016 | King et al. | |
| 2016/0204654 A1 | 7/2016 | Mondal | |
| 2016/0214737 A1 | 7/2016 | Radun et al. | |
| 2016/0265469 A1 | 9/2016 | Harada | |
| 2016/0288663 A1 * | 10/2016 | Hikiri | B60L 50/51 |
| 2016/0378085 A1 | 12/2016 | Guo | |
| 2017/0057363 A1 | 3/2017 | Huh | |
| 2017/0063124 A1 | 3/2017 | Yu et al. | |
| 2017/0077739 A1 | 3/2017 | Jouper | |
| 2017/0155266 A1 | 6/2017 | Namou | |
| 2017/0166081 A1 | 6/2017 | Kwon | |

OTHER PUBLICATIONS

Wilhide, U.S. Appl. No. 15/639,209, filed Jun. 30, 2017 and entitled "HESM Fast Recharge Algorithm".

Heglund, et al., U.S. Appl. No. 15/638,986, filed Jun. 30, 2017 and entitled "Hybrid Energy Storage Modules for Directed Energy Systems".

Wilhide, U.S. Appl. No. 15/639,128, filed Jun. 30, 2017 and entitled "HESM Parallel Response Mode".

USPTO, Notice of Allowance dated Sep. 24, 2019 in U.S. Appl. No. 15/639,128.

USPTO, First Action Interview Office Action dated Nov. 15, 2019 in U.S. Appl. No. 15/639,209.

Wikipedia contributors. (Apr. 14, 2019). Slew rate. In Wikipedia, The Free Encyclopedia. Retrieved 20:52, Sep. 18, 2019, from https://en.wikipedia.org/w/index.php?title=Slew_rate&oldid=892432254 (Year 2019).

USPTO, Pre-Interview First Office Action dated Aug. 21, 2019 in U.S. Appl. No. 15/639,104.

USPTO, Non Office Action dated Sep. 26, 2019 in U.S. Appl. No. 15/638,986.

USPTO, Pre-Interview First Office Action dated Aug. 22, 2019 in U.S. Appl. No. 15/639,209.

USPTO, Notice of Allowance dated Jan. 31, 2020 in U.S. Appl. No. 15/638,986.

* cited by examiner

HESM HIGH PULSE POWER ALGORITHM

FIELD

The present disclosure is directed to power management systems for charging and discharging batteries and ultracapacitors of a hybrid energy storage module of an aircraft.

BACKGROUND

Many new components are being developed for use with aircraft. Some of these components may operate based on electrical energy. The electrical energy may be generated by a generator that converts mechanical power from an engine of the aircraft into electrical energy. The amplitude of the electrical energy required for some of these components may be relatively large. In that regard, it may be undesirable for the total electrical energy to be provided by the generator. This is because generation of the requisite electrical energy may undesirably affect performance of the engine, potentially placing the pilot and aircraft in harm's way.

SUMMARY

Described herein is a hybrid energy storage module (HESM) configured to be used on an aircraft to provide electrical energy. The HESM includes a first energy storage component and a second energy storage component each configured to receive the electrical energy, store the electrical energy, and discharge the electrical energy. The HESM also includes a controller coupled to the first energy storage component and the second energy storage component. The controller is configured to control charging and discharging of the first energy storage component and of the second energy storage component such that the first energy storage component is charged to a desired first energy storage component state of charge (SOC) before the second energy storage component is charged.

In any of the foregoing embodiments, the first energy storage component is an ultracapacitor, the second energy storage component is a battery, and the desired first energy storage component SOC is a desired ultracapacitor SOC.

In any of the foregoing embodiments, the controller includes a discharge lookup function configured to receive a HESM output current command corresponding to a requested HESM output current and to output a second energy storage component output ratio corresponding to a percentage of the HESM output current command that is to be provided by the second energy storage component based on the HESM output current command; and a second energy storage component output multiplier configured to determine a second energy storage component output current command by multiplying the HESM output current command by the second energy storage component output ratio.

In any of the foregoing embodiments, the second energy storage component output ratio varies based on an amount of energy that the first energy storage component absorbs during an "off" cycle of the HESM.

In any of the foregoing embodiments, the controller further includes an input difference module configured to determine a second energy storage component input ratio such that a sum of input ratios from all energy storage components equals 1; and a first energy storage component output multiplier configured to determine a first energy storage component output current command by multiplying the HESM output current command by the first energy storage component output ratio.

In any of the foregoing embodiments, the controller further includes a second energy storage component output limit function configured to limit the second energy storage component output current command to a limited second energy storage component output current command corresponding to a second energy storage component current level at which the second energy storage component is capable of providing; and a first energy storage component output limit function configured to limit the first energy storage component output current command to a limited first energy storage component output current command corresponding to a first energy storage component current level at which the first energy storage component is capable of providing.

In any of the foregoing embodiments, the controller further includes a SOC difference module configured to determine a SOC difference corresponding to a difference between the desired first energy storage component SOC and the current first energy storage component SOC; a charge limit function configured to output a first energy storage component input ratio corresponding to a percentage of a HESM input current command that is to be provided to the first energy storage component based on the SOC difference; and a first energy storage component input multiplier configured to determine a first energy storage component input current command by multiplying the HESM input current command by the first energy storage component input ratio.

In any of the foregoing embodiments, the controller further includes a proportional gain module positioned between the SOC difference module and the charge limit function and configured to multiply the SOC difference by a constant value.

In any of the foregoing embodiments, the controller further includes an input difference module configured to determine a second energy storage component input ratio such that a sum of the second energy storage component input ratio and the first energy storage component input ratio equals 1; and a second energy storage component input multiplier configured to determine a second energy storage component input current command by multiplying the HESM input current command by the second energy storage component input ratio.

In any of the foregoing embodiments, the controller further includes a first energy storage component input limit function configured to limit the first energy storage component input current command to a limited first energy storage component input current command corresponding to a first energy storage component current rate which the first energy storage component is capable of receiving.

In any of the foregoing embodiments, the controller further includes a verification difference module configured to determine a difference between the HESM input current command and the limited first energy storage component input current command; and a verification addition module configured to add the difference between the HESM input current command and the limited first energy storage component input current command to the second energy storage component input current command.

In any of the foregoing embodiments, the controller further includes a second energy storage component input limit function configured to limit the second energy storage component input current command to a limited second energy storage component input current command corresponding to a second energy storage component current rate which the second energy storage component is capable of receiving.

Also disclosed is a controller for use with a hybrid energy storage module (HESM) that is configured for use with an aircraft and includes a battery and an ultracapacitor. The controller includes a SOC difference module configured to determine a SOC difference corresponding to a difference between a desired ultracapacitor SOC and a current ultracapacitor SOC. The controller further includes a charge limit function configured to output an ultracapacitor input ratio corresponding to a percentage of a HESM input current command that is to be provided to the ultracapacitor based on the SOC difference. The controller further includes an ultracapacitor input multiplier configured to determine an ultracapacitor input current command by multiplying the HESM input current command by the ultracapacitor input ratio.

Any of the foregoing embodiments may also include a proportional gain module positioned between the SOC difference module and the charge limit function and configured to multiply the SOC difference by a constant value.

Any of the foregoing embodiments may also include an input difference module configured to determine a battery input ratio such that a sum of the battery input ratio and the ultracapacitor input ratio equals 1; and a battery input multiplier configured to determine a battery input current command by multiplying the HESM input current command by the battery input ratio.

Any of the foregoing embodiments may also include an ultracapacitor input limit function configured to limit the ultracapacitor input current command to a limited ultracapacitor input current command corresponding to an ultracapacitor current rate which the ultracapacitor is capable of receiving; a verification difference module configured to determine a difference between the HESM input current command and the ultracapacitor current rate which the ultracapacitor is capable of receiving; and a verification addition module configured to add the difference between the HESM input current command and the ultracapacitor current rate which the ultracapacitor is capable of receiving to the battery input current command.

Also disclosed is a controller for use with a hybrid energy storage module (HESM) that is configured for use with an aircraft and includes a battery and an ultracapacitor. The controller includes a discharge lookup function configured to receive a HESM output current command corresponding to a requested HESM output current and to output a battery output ratio corresponding to a percentage of the HESM output current command that is to be provided by the battery based on the HESM output current command. The controller also includes a battery output multiplier configured to determine a battery output current command by multiplying the HESM output current command by the battery output ratio.

Any of the foregoing embodiments may also include an output difference module configured to determine an ultracapacitor output ratio such that a sum of the ultracapacitor output ratio and the battery output ratio equals 1; and an ultracapacitor output multiplier configured to determine an ultracapacitor output current command by multiplying the HESM output current command by the ultracapacitor output ratio.

Any of the foregoing embodiments may also include a battery output limit function configured to limit the battery output current command to a limited battery output current command corresponding to a battery current level at which the battery is capable of providing; and an ultracapacitor output limit function configured to limit the ultracapacitor output current command to a limited ultracapacitor output current command corresponding to an ultracapacitor current level at which the ultracapacitor is capable of providing.

In any of the foregoing embodiments, the battery output ratio varies based on an amount of energy that the ultracapacitor absorbs during an "off" cycle of the HESM.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
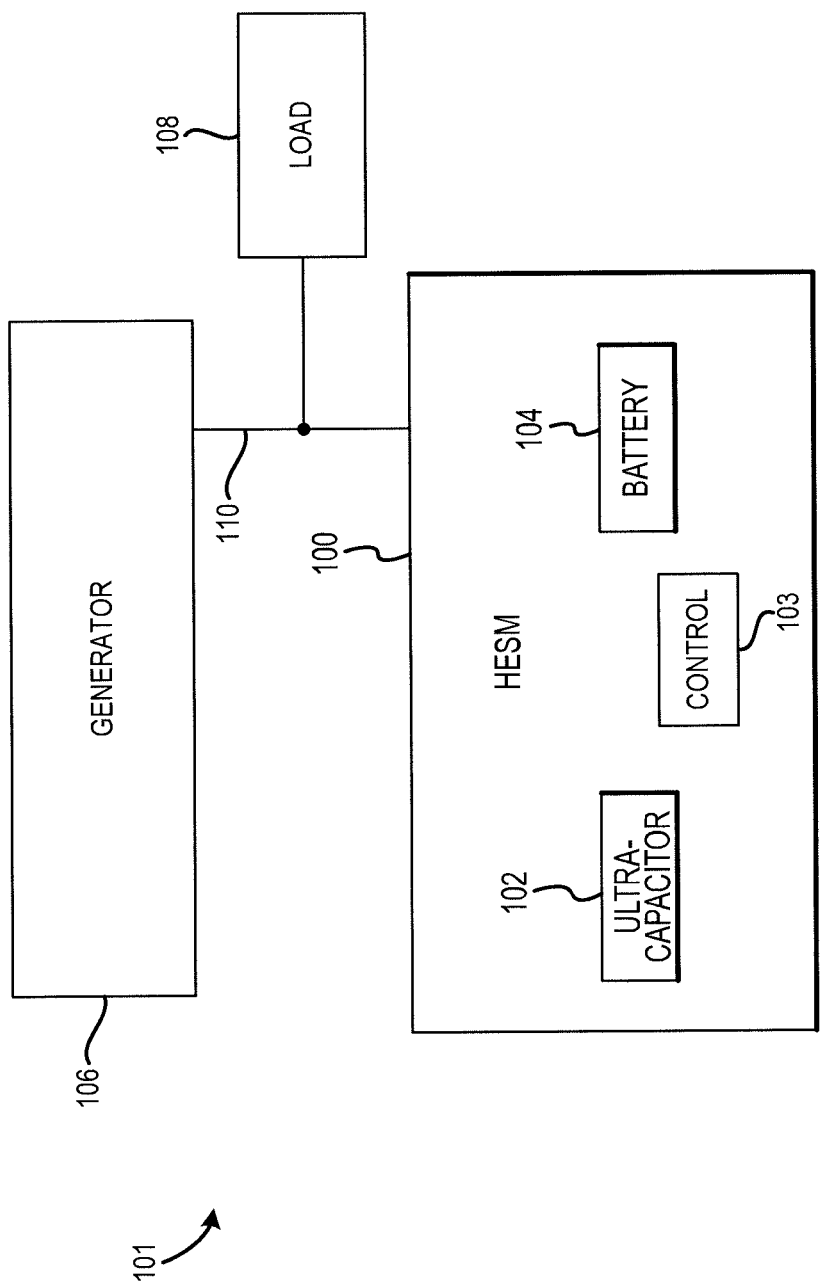
FIG. 1 is a block diagram illustrating features of a power management system of an aircraft, in accordance with various embodiments of the present disclosure.

FIG. 1 illustrates a power management system 101 for use with an aircraft. The power management system 101 includes a hybrid energy storage module (HESM) 100, a generator 106, and a load 108. The load 108 may include any load that operates using electrical energy.

The generator 106 may be coupled to an engine of the aircraft, such as a gas turbine engine, and may convert mechanical power from the engine into electrical energy.

The HESM 100 may be designed to receive, store, and discharge electrical energy. In that regard, the HESM 100 includes one or more first energy storage component (such as an ultracapacitor) 102, one or more second energy storage component (such as a battery 104), and a controller 103. The ultracapacitor 102 may include one or multiple ultracapacitors, may be referred to as a supercapacitor or an electric double-layer capacitor and may use one or both of electrostatic double-layer capacitance or electrochemical pseudo-capacitance to store an electrical charge. A charge level of the ultracapacitor 102 may be referred to as an ultracapacitor state of charge (SOC). The ultracapacitor 102 may store less charge than a battery, and may store more charge than an electrolytic or other capacitor.

In various embodiments, the HESM 100 may include any two or more energy storage components. For example, a HESM may include a battery and a fuel cell, an ultracapacitor and a fuel cell, or the like.

The battery 104 may include any battery or combination of batteries capable of storing an electrical charge. For example, the battery 104 may include a lithium-ion battery, a nickel cadmium battery, a nickel metal hydride battery, a lead acid batter), or the like. A charge level of the battery 104 may be referred to as a battery SOC.

In response to the load 108 drawing electrical energy, the electrical energy may be provided simultaneously from the HESM 100 and from the generator 106. The load 108 may draw power in a series of pulses. For example, the load 106 may draw and utilize power for 8 seconds ("on" cycle), may cease drawing the power for 2 seconds ("off" cycle), may again draw the power for 8 seconds, and so forth.

The ultracapacitor 102 may store less total electrical energy than the battery 104 and may also be capable of withstanding more charge/discharge cycles than the battery 104 without affecting performance of the ultracapacitor 102 over its lifetime. In that regard, it may be desirable for the ultracapacitor 102 to be recharged after each "on" cycle of the load 106 (i.e., during the "off" cycle), and it may be desirable for the battery 104 to be recharged after multiple cycles of the load 106.

In that regard, the controller 103 may control the charging and the discharging of the ultracapacitor 102 and the battery 104 such that the ultracapacitor 102 and the battery 104 discharge simultaneously to power the load 108, and the ultracapacitor 102 recharges prior to recharging of the battery 104.

The controller 103 may receive information from a power bus 110 that links the load 108, the generator 106, and the HESM 100. For example, the information may include a request for a measured amount of current, a request for a measured amount of voltage, a current measured voltage on the bus 110, or the like. Based on this information, the HESM 100 may generate an internal current command signal corresponding to an amount of current to be output by the HESM 100 or to an amount of current that will be provided to the HESM 100 to charge the ultracapacitor 102 and the battery 104.

Figure 2:
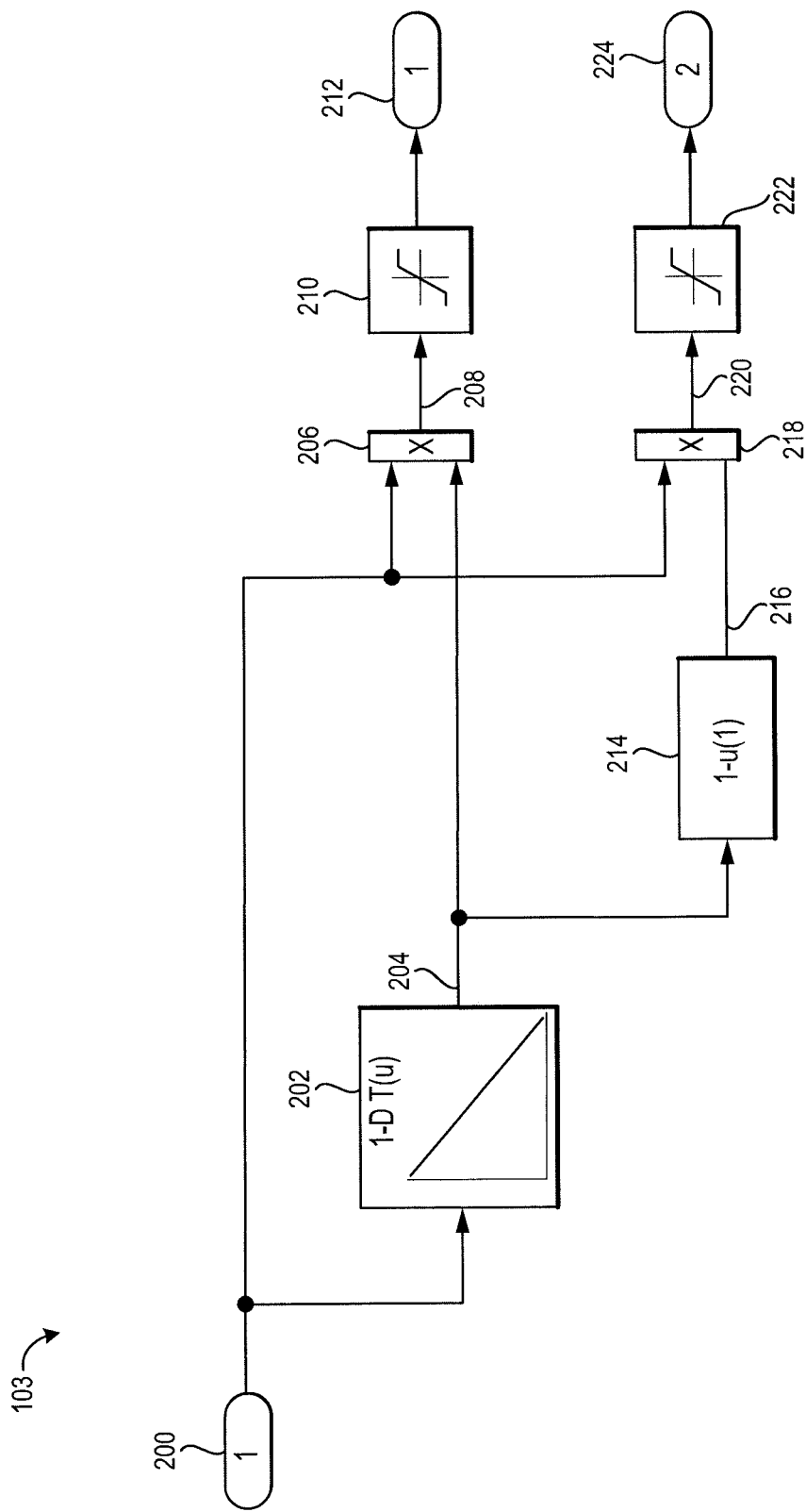
FIG. 2 is a schematic view of functions of a controller of the power management system of FIG. 1, in accordance with various embodiments of the present disclosure.

Referring to FIGS. 1 and 2, the controller 103 may include various components or modules for controlling discharge of the ultracapacitor 102 and the battery 104. The functions illustrated in FIG. 2 may be performed when the voltage on the power bus 110 is less than its desired voltage (indicating that the load 108 is drawing energy or power). In various embodiments, the functions illustrated in FIG. 2 may be performed when a current command value is greater than 0.

A HESM output current command 200 may correspond to a desired amount of current to be output by the HESM 100. The HESM output current command 200 may be determined by the controller 103 or may be received from the power bus 110.

The HESM output current command 200 may be received by a discharge lookup function 202. The discharge lookup function 202 may determine a battery output ratio 204 that corresponds to a percentage of the HESM output current command 200 that is to be provided by the battery 104. The discharge lookup function 202 may include a lookup table that receives one or more parameters, including the HESM output current command 200, and finds and outputs the corresponding battery output ratio 204. In various embodiments, the discharge lookup function 202 may also determine the battery output ratio 204 based on at least one of a current SOC of the battery 104, a current SOC of the ultracapacitor 102, or a time duration since the start of a current "on" cycle.

A battery output multiplier 206 may receive the HESM output current command 200 and the battery output ratio 204. The battery output multiplier 206 may multiply the HESM output current command 200 and the battery output ratio 204, resulting in a battery output current command 208. The battery output current command 208 corresponds to a requested current to be output by the battery 104.

The battery output current command 208 may be received by a battery output limit function 210. The battery output limit function 210 may compare the battery output current command 208 to a maximum battery discharge rate, and may output a limited battery output current command 212 that is less than or equal to the maximum battery discharge rate. A discharge rate of the battery that is greater than the maximum battery discharge rate may be undesirable, for example, as it may damage the battery 104. In that regard, the maximum battery discharge rate may correspond to a battery current level which the battery 104 is capable of providing without substantial risk of harm to the battery 104.

The limited battery output current command 212 may be used to control an amount of current provided by the battery 104. For example, the limited battery output current command 212 may be received by the battery 104, and the battery 104 may output an amount of current that is equal to the limited battery output current command 212.

The battery output ratio 204 may also be received by an output difference module 214. The output difference module 214 may subtract the battery output ratio 204 from a value of 1. In that regard, the output difference module 214 may output an ultracapacitor output ratio 216 that is the result of the subtraction. Because the HESM output current command 200 corresponds to a desired current to be output by the entire HESM 100, the sum of the battery output ratio 204 and the ultracapacitor output ratio 216 is equal to 1.

In response to initial receipt of the HESM output current command 200, the ultracapacitor 102 may be fully charged. In that regard and upon initial receipt, the ultracapacitor 102 and the battery 104 may each output between 40 percent (40%) and 60%, such as 50%, of the HESM output current command 200.

As the ultracapacitor 102 discharges, it may be incapable of outputting a consistent current. In that regard, as time advances after initial receipt of the HESM output current command 200, the battery output ratio 204 may increase, such as to between 85% and 95%, such as 90%, and the ultracapacitor output ratio 216 may decrease, such as to between 5% and 15%, such as 10%. The amount that the ultracapacitor 102 discharges may be based on how much energy is absorbed by the ultracapacitor 102 during the "off" cycle. During the entire discharge cycle, the generator 106 may likewise provide electrical energy to the load 108. This may advantageously cause the load applied to the generator 106 at a constant level.

The ultracapacitor output ratio 216 may be received by an ultracapacitor output multiplier 218. The ultracapacitor output multiplier 218 may multiply the HESM output current command 200 and the ultracapacitor output ratio 216. The result of the multiplication may be output as an ultracapacitor current command 220.

The ultracapacitor current command 220 may be received by an ultracapacitor output limit function 222. The ultracapacitor output limit function 222 may function in a similar manner as the battery output limit function 210. In that regard, the ultracapacitor output limit function 222 may output a limited ultracapacitor output current command 224 that is less than or equal to a maximum ultracapacitor discharge rate. A discharge rate of the ultracapacitor 102 that is greater than the maximum ultracapacitor discharge rate may be undesirable.

The limited ultracapacitor output current command 224 may be used to control the current output of the ultracapacitor 102. In that regard, the ultracapacitor 102 may output an amount of current that is equal to the limited ultracapacitor output current command 224.

Figure 3:
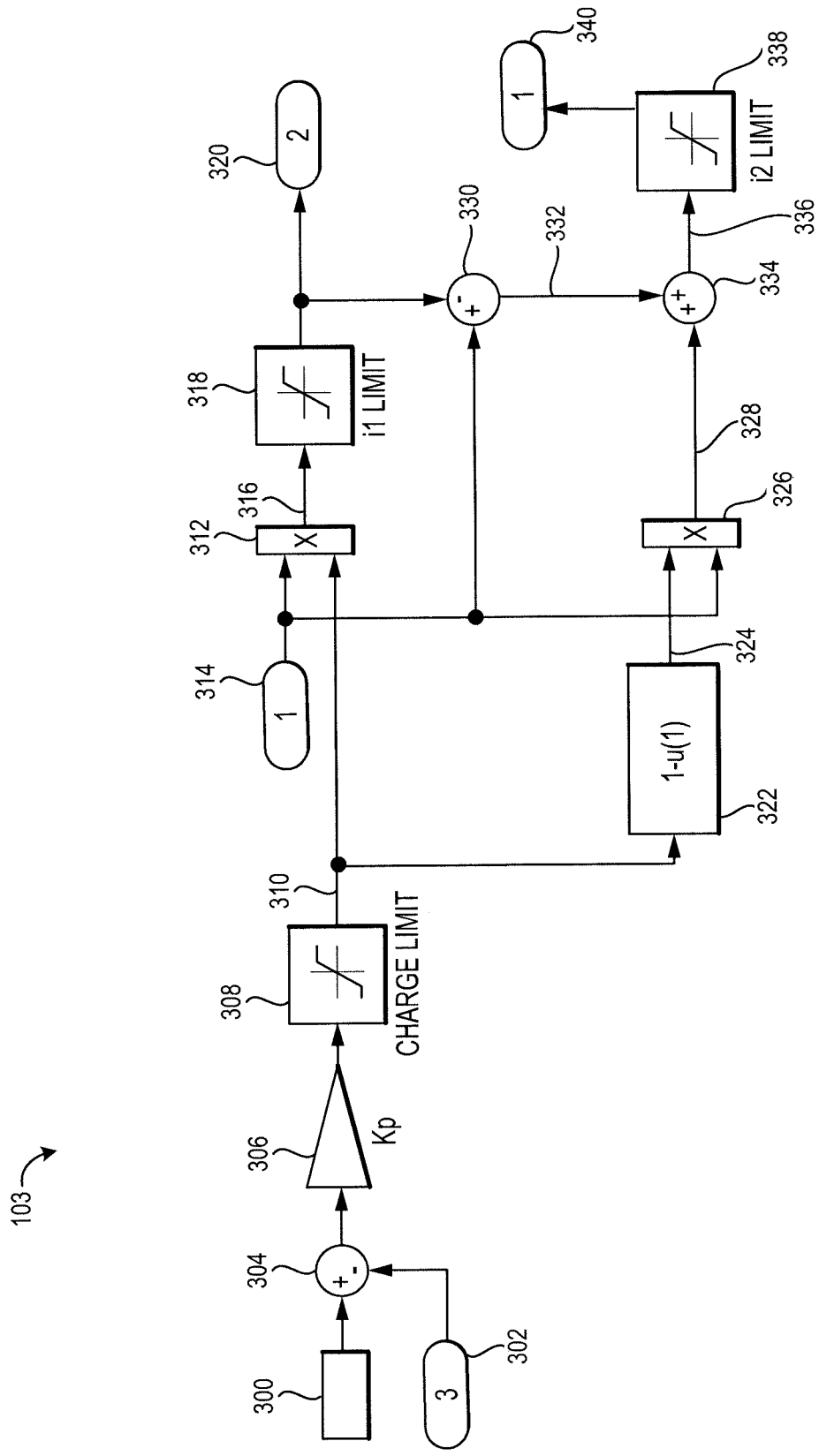
FIG. 3 is a schematic view of additional functions of a controller of the power management system of FIG. 1, in accordance with various embodiments of the present disclosure.

Referring to FIGS. 1 and 3, the controller 103 may include various components or modules for controlling charging of the ultracapacitor 102 and the battery 104. The functions illustrated in FIG. 3 may be performed in response to the voltage on the power bus 110 being greater than its desired voltage. In various embodiments, the functions illustrated in FIG. 3 may be performed when a current command value is less than 0.

A SOC difference module 304 may receive a desired ultracapacitor SOC 300 and a current ultracapacitor SOC 302. The desired ultracapacitor SOC 300 may correspond to a SOC of the ultracapacitor 102 at which the ultracapacitor 102 is considered fully charged. In various embodiments, the desired ultracapacitor SOC 300 may be between 85 and 95, such as 91, indicating that it is desirable for the ultracapacitor 102 to be 91% charged. The current ultracapacitor SOC 302 may be received or detected by the ultracapacitor 102 or another component and may correspond to the current SOC of the ultracapacitor 102.

During a charging cycle, it is desirable for the ultracapacitor 102 to be charged to the desired ultracapacitor SOC 300 before the battery 104 is charged. In that regard, a charge limit function 308 may analyze the results of the SOC difference module 304 to determine whether the ultracapacitor 102 is charged to the desired ultracapacitor SOC 300. The result of the SOC difference module 304 may be multiplied by a constant value in a proportional gain module 306. By multiplying the result of the SOC difference module 304 by the constant value, the precision of the charge limit function 308 may be increased.

In particular, the charge limit function 308 may compare the output of the proportional gain module 306 to a set of stored data. The stored data may include values that correspond to the desired ultracapacitor SOC 300 multiplied by the constant value. The output of the charge limit function 308 may be an ultracapacitor input ratio 310 that corresponds to a percentage of the power input that is to be provided to the ultracapacitor 102. For example, if the output of the proportional gain module 306 is less than the desired ultracapacitor SOC 300 multiplied by the constant value then the output of the charge limit function 308 may be 1, indicating that 100% of the incoming charge is to be provided to the ultracapacitor 102. As the ultracapacitor 102 approaches or reaches the desired ultracapacitor SOC 300, the output of the charge limit function 308 may begin to decrease towards 0. In that regard, the amount of power provided to the ultracapacitor 102 may begin to decrease and the amount of power provided to the battery 104 may begin to increase.

The ultracapacitor input ratio 310 may be multiplied by a HESM input current command 314 in an ultracapacitor input multiplier 312. The HESM input current command 314 may indicate an amount of current that is being provided to the HESM 100 to charge the ultracapacitor 102 and the battery 104. The result of the multiplication may be an ultracapacitor input current command 316 which indicates a desired amount of current to be received by the ultracapacitor 102.

The ultracapacitor input current command 316 may be received by an ultracapacitor input limit function 318. The ultracapacitor input limit function 318 may function in a similar manner as the battery output limit function 210 of FIG. 2. In particular, the ultracapacitor input limit function 318 may limit the ultracapacitor input current command 316 to a current value that may be safely received by the ultracapacitor 102 without significant risk of harm to the ultracapacitor 102.

The ultracapacitor input limit function 318 may output a limited ultracapacitor input current command 320. The limited ultracapacitor input current command 320 may be used to control the amount of current that is provided to the ultracapacitor 102.

The ultracapacitor input ratio 310 that is output by the charge limit function 308 may be received by an input difference module 322. The input difference module 322 may subtract the ultracapacitor input ratio 310 from a value of 1, resulting in a battery input ratio 324. The battery input ratio 324 corresponds to a percentage of the current provided to the HESM 100 that is to be transferred to the battery 104 to recharge the battery 104. In that regard, the sum of the battery input ratio 324 and the ultracapacitor input ratio 310 equals 1.

The battery input ratio 324 and the HESM input current command 314 may be received by a battery input multiplier 326. The battery input multiplier 326 may multiply the battery input ratio 324 by the HESM input current command 314. The results of the multiplication may be a battery input current command 328. The battery input current command 328 may indicate an amount of current to be provided to the battery 104.

The controller 103 may include a verification difference module 330 and a verification addition module 334 to ensure that the ultracapacitor 102 is not overcharged. The verification difference module 330 receives the HESM input current command 314 and the limited ultracapacitor current command 320 and determines a difference 332 between them. In that regard, the difference 332 corresponds to a difference between the amount of current provided to the HESM 100 and the amount of current to be provided to the ultracapacitor 102.

The verification addition module 334 receives the difference value 332 and adds the difference value 332 to the battery input current command 328. Stated differently, the verification addition module 334 adds the difference 332 between the HESM input current command 314 and the limited ultracapacitor input current command 320 to the amount of current to be provided to the battery 104.

The results of the verification addition module 334 may be a total battery input current command 336. The total battery input current command 336 may be received by a battery input limit function 338. The battery input limit function 338 may function in a similar manner as the battery output limit function 210 of FIG. 2. In that regard, the battery input limit function 338 may limit the total battery input current command 336 to and amount of current that may be received by the battery 104 without significant risk of harm to the battery 104.

The output of the battery input limit function 338 may be a limited battery input current command 340. The limited battery input current command 340 may be used to control the amount of current that is provided to the battery 104 for recharging the battery 104.

Referring to FIGS. 2 and 3, each component or function of the controller 103 may be implemented using hardware or software. For example, the controller 103 may include a central processing unit (CPU), an accelerated processing unit (APU), a digital signal processor (DSP), a field programmable gate array (FPGA), an application specific integrated circuit (ASIC) or the like, and each component or function may be performed using software. In various embodiments, each component or function of the controller 103 may be performed by one or more separate piece of hardware. In various embodiments, multiple component or function may be performed by a single piece of hardware.

Figure 4:
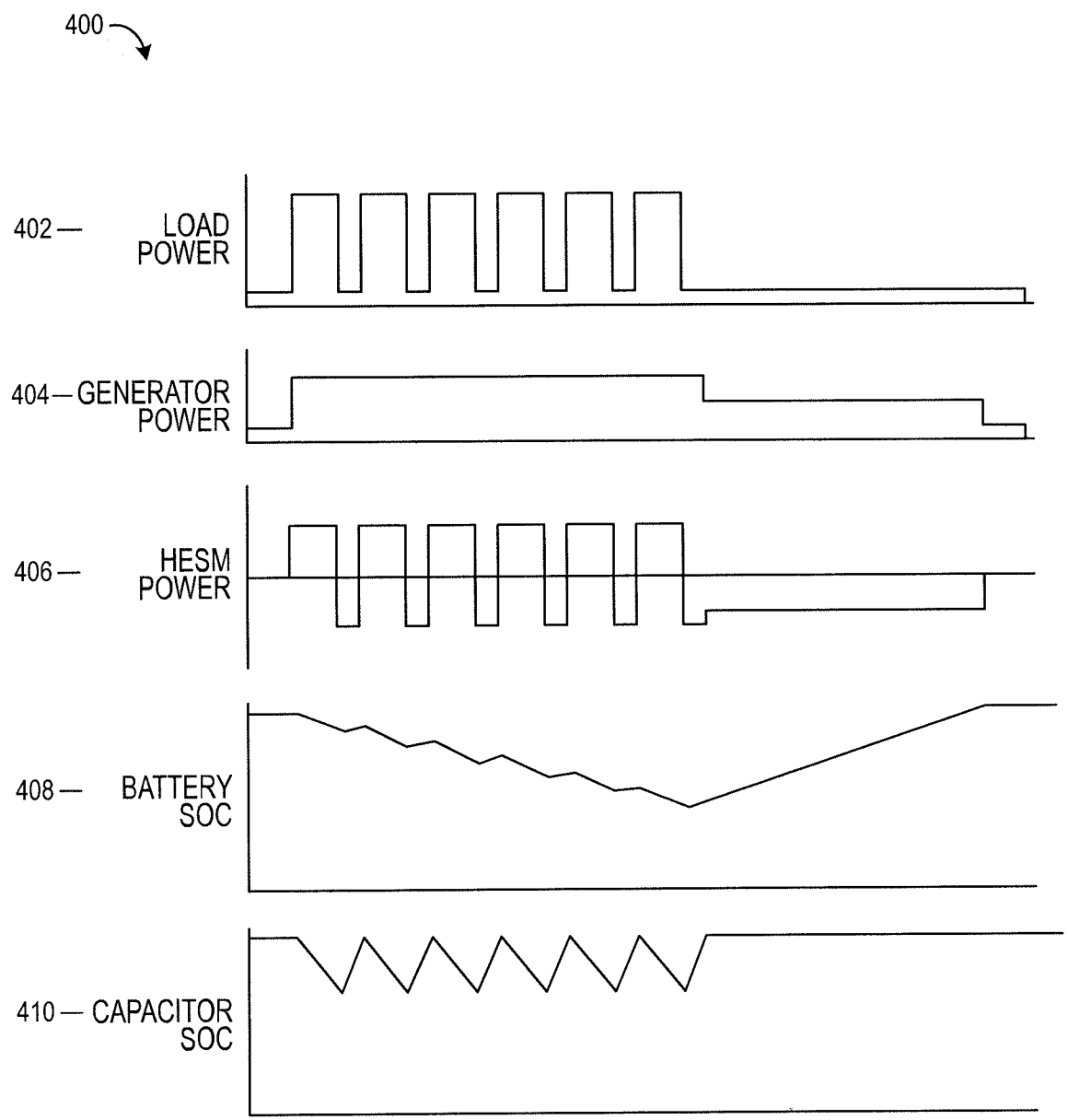
FIG. 4 is a graph illustrating power distribution of the power management system of FIG. 1, in accordance with various embodiments of the present disclosure.

Referring to FIGS. 1 and 4, a chart 400 illustrates exemplary operation of the system 101. The load power 402 may correspond to power usage by the load 108. As shown, the load power 402 includes a series of pulses which may correspond to an "on" cycle of 8 seconds during which the load 108 uses power, and an "off" cycle of 2 seconds during which the load 108 uses substantially no power.

As the power is initially requested for the load 108, the HESM 100 may begin to output electrical energy, as shown by HESM power 406. Simultaneously, the generator 106 may begin to output electrical energy, as shown by the generator power 404. In response to the load 108 receiving power, the electrical energy generated by both of the HESM 100 and by the generator 106 may be provided to the load 108. In particular, electrical energy may be discharged from the ultracapacitor 102 and from the battery 104, as shown in the capacitor SOC 410 and the battery SOC 408, respectively.

As the load power 402 reaches the "off" cycle, the generator 106 may continue to generate power. Because the ultracapacitor 102 has less energy storage capacity than the battery 104, the SOC of the ultracapacitor 102 may be lower than the SOC of the battery 104. Accordingly, a majority of the energy generated by the generator 106 may be provided to the ultracapacitor 102 to recharge the ultracapacitor 102. The battery 104 may not receive any electrical energy, or may receive minimal electrical energy, until the ultracapacitor 102 is charged to the desired ultracapacitor SOC, which may not happen during the load power series.

As the load power reaches another "on" cycle, power may again be provided to the load 108 from a combination of the generator 106, the ultracapacitor 102, and the battery 104. Because the battery 104 may receive minimal charge during the "off" cycle, the battery SOC 408 may continue to become reduced during each "on" cycle without being recharged to a previous SOC. This charging structure may be desirable as the battery 104 may become damaged in response to fewer charge/discharge cycles than the ultracapacitor 102.

After the load power series is complete, the generator 106 may continue to generate energy to recharge the ultracapacitor 102 and the battery 104. As shown, the capacitor SOC 410 is charged to the desired ultracapacitor SOC prior to energy being provided to the battery 104 to charge the battery 104. In response to the capacitor SOC 410 reaching the desired ultracapacitor SOC, the energy generated by the generator 106 may be provided to the battery 104 to increase the battery SOC 408 to a desired battery SOC. In response to the battery SOC 408 reaching the desired battery SOC, the generator 106 may stop outputting energy, or may output a reduced energy level.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid energy storage module (HESM) configured to be used on an aircraft to provide electrical energy, the HESM comprising:

a first energy storage component and a second energy storage component each configured to receive the electrical energy, store the electrical energy, and discharge the electrical energy; and a controller coupled to the first energy storage component and the second energy storage component and configured to:

control charging and discharging of the first energy storage component and of the second energy storage component such that the first energy storage component is charged to a desired first energy storage component state of charge (SOC) before the second energy storage component is charged, control the first energy storage device and the second energy storage device to discharge simultaneously to supplement power provided by a generator during a pulsed power request of a series of pulsed power requests, and control at least the first energy storage component to charge using the power provided by the generator between each of the series of the pulsed power requests, wherein the controller includes:

a discharge lookup function configured to receive a HESM output current command corresponding to a requested HESM output current and to output a second energy storage component output ratio corresponding to a percentage of the HESM output current command that is to be provided by the second energy storage component based on the HESM output current command; and a second energy storage component output multiplier configured to determine a second energy storage component output current command by multiplying the HESM output current command by the second energy storage component output ratio.

2. The HESM of claim 1, wherein:
the first energy storage component is an ultracapacitor;
the second energy storage component is a battery; and
the desired first energy storage component SOC is a desired ultracapacitor SOC.

3. The HESM of claim 2, wherein the controller further includes:

a SOC difference module configured to determine a SOC difference corresponding to a difference between the desired first energy storage component SOC and the current first energy storage component SOC;

a charge limit function configured to output a first energy storage component input ratio corresponding to a percentage of a HESM input current command that is to be provided to the first energy storage component based on the SOC difference; and a first energy storage component input multiplier configured to determine a first energy storage component input current command by multiplying the HESM input current command by the first energy storage component input ratio.

4. The HESM of claim 3, wherein the controller further includes a proportional gain module positioned between the SOC difference module and the charge limit function and configured to multiply the SOC difference by a constant value.

5. The HESM of claim 3, wherein the controller further includes:

an input difference module configured to determine a second energy storage component input ratio such that a sum of input ratios from all energy storage components equals 1; and a second energy storage component input multiplier configured to determine a second energy storage component input current command by multiplying the HESM input current command by the second energy storage component input ratio.

6. The HESM of claim 5, wherein the controller further includes a first energy storage component input limit function configured to limit the first energy storage component input current command to a limited first energy storage component input current command corresponding to a first energy storage component current rate which the first energy storage component is capable of receiving.

7. The HESM of claim 6, wherein the controller further includes:

a verification difference module configured to determine a difference between the HESM input current command and the limited first energy storage component input current command; and a verification addition module configured to add the difference between the HESM input current command and the limited first energy storage component input current command to the second energy storage component input current command.

8. The HESM of claim 6, wherein the controller further includes a second energy storage component input limit function configured to limit the second energy storage component input current command to a limited second energy storage component input current command corresponding to a second energy storage component current rate which the second energy storage component is capable of receiving.

9. The HESM of claim 1, wherein the second energy storage component output ratio varies based on an amount of energy that the first energy storage component absorbs during an "off" cycle of the HESM.

10. The HESM of claim 1, wherein the controller further includes:

an output difference module configured to determine a first energy storage component output ratio such that a sum of the first energy storage component output ratio and the second energy storage component output ratio equals 1; and a first energy storage component output multiplier configured to determine a first energy storage component output current command by multiplying the HESM output current command by the first energy storage component output ratio.

11. The HESM of claim 10, wherein the controller further includes:

a second energy storage component output limit function configured to limit the second energy storage component output current command to a limited second energy storage component output current command corresponding to a second energy storage component current level at which the second energy storage component is capable of providing; and a first energy storage component output limit function configured to limit the first energy storage component output current command to a limited first energy storage component output current command corresponding to a first energy storage component current level at which the first energy storage component is capable of providing.

12. A controller for use with a hybrid energy storage module (HESM) that is configured for use with an aircraft and includes a battery and an ultracapacitor, the controller comprising:

a SOC difference module configured to determine a SOC difference corresponding to a difference between a desired ultracapacitor SOC and a current ultracapacitor SOC;

a charge limit function configured to output an ultracapacitor input ratio corresponding to a percentage of a HESM input current command that is to be provided to the ultracapacitor based on the SOC difference;

an ultracapacitor input multiplier configured to determine an ultracapacitor input current command by multiplying the HESM input current command by the ultracapacitor input ratio; and a proportional gain module positioned between the SOC difference module and the charge limit function and configured to multiply the SOC difference by a constant value, the controller configured to control the ultracapacitor and the battery to discharge simultaneously to supplement power provided by a generator during a pulsed power request of a series of pulsed power requests, and to control at least the ultracapacitor to charge using the power provided by the generator between each of the series of the pulsed power requests.

13. The controller of claim 12, further comprising:

an input difference module configured to determine a battery input ratio such that a sum of the battery input ratio and the ultracapacitor input ratio equals 1; and a battery input multiplier configured to determine a battery input current command by multiplying the HESM input current command by the battery input ratio.

14. The controller of claim 13, further comprising:

an ultracapacitor input limit function configured to limit the ultracapacitor input current command to a limited ultracapacitor input current command corresponding to an ultracapacitor current rate which the ultracapacitor is capable of receiving;

a verification difference module configured to determine a difference between the HESM input current command and the ultracapacitor current rate which the ultracapacitor is capable of receiving; and a verification addition module configured to add the difference between the HESM input current command and the ultracapacitor current rate which the ultracapacitor is capable of receiving to the battery input current command.

15. A controller for use with a hybrid energy storage module (HESM) that is configured for use with an aircraft and includes a battery and an ultracapacitor, the controller comprising:

a discharge lookup function configured to receive a HESM output current command corresponding to a requested HESM output current and to output a battery output ratio corresponding to a percentage of the HESM output current command that is to be provided by the battery based on the HESM output current command;

a battery output multiplier configured to determine a battery output current command by multiplying the HESM output current command by the battery output ratio;

an output difference module configured to determine an ultracapacitor output ratio such that a sum of the ultracapacitor output ratio and the battery output ratio equals 1; and an ultracapacitor output multiplier configured to determine an ultracapacitor output current command by multiplying the HESM output current command by the ultracapacitor output ratio, the controller configured to control the ultracapacitor and the battery to discharge simultaneously to supplement power provided by a generator during a pulsed power request of a series of pulsed power requests, and to control at least the ultracapacitor to charge using the power provided by the generator between each of the series of the pulsed power requests.

16. The controller of claim 15, further comprising:

a battery output limit function configured to limit the battery output current command to a limited battery output current command corresponding to a battery current level at which the battery is capable of providing; and an ultracapacitor output limit function configured to limit the ultracapacitor output current command to a limited ultracapacitor output current command corresponding to an ultracapacitor current level at which the ultracapacitor is capable of providing.

17. The controller of claim 15, wherein the battery output ratio varies based on an amount of energy that the ultracapacitor absorbs during an "off" cycle of the HESM.

* * * * *